United States Patent [19]

Young

[11] Patent Number: 5,085,457
[45] Date of Patent: Feb. 4, 1992

[54] INDEPENDENT FRONT AIR SUSPENSION APPARATUS AND METHOD

[75] Inventor: Jonathan Young, Fremont, Calif.

[73] Assignee: Paccar Inc., Bellevue, Wash.

[21] Appl. No.: 702,131

[22] Filed: May 13, 1991

Related U.S. Application Data

[63] Continuation of Ser. No. 409,248, Sep. 19, 1989, abandoned.

[51] Int. Cl.⁵ .......................... B60G 3/20; B60G 11/28
[52] U.S. Cl. .................................. 280/693; 280/673; 267/256
[58] Field of Search ............... 280/673, 671, 672, 670, 280/666, 667, 701, 693, 690, 691, 698, 688, 692, 694, 697, 696; 267/256, 248, 251, 254

[56] References Cited

U.S. PATENT DOCUMENTS

| | | |
|---|---|---|
| 2,115,072 | 4/1938 | Hunt et al. |
| 2,226,605 | 12/1940 | Geyer et al. |
| 2,580,559 | 1/1952 | Kolbe. |
| 2,760,787 | 8/1956 | Muller. |
| 2,795,434 | 6/1957 | Gouirand. |
| 3,003,781 | 10/1961 | Black. |
| 3,315,978 | 4/1967 | Chieger et al. |
| 3,614,121 | 10/1971 | Wolf. |
| 4,057,120 | 11/1977 | Roethlisberger. |
| 4,162,799 | 7/1979 | Willetts. |
| 4,531,781 | 7/3085 | Hunt et al. |
| 4,802,690 | 2/1989 | Raidel. |

FOREIGN PATENT DOCUMENTS

| | | | |
|---|---|---|---|
| 0217261 | 4/1987 | European Pat. Off. | |
| 1133596 | 3/1957 | France | 267/248 |
| 0170111 | 7/1988 | Japan | 267/256 |
| 424678 | 2/1935 | United Kingdom. | |
| 1081469 | 8/1967 | United Kingdom. | |
| 1263635 | 2/1972 | United Kingdom. | |

Primary Examiner—Charles A. Marmor
Assistant Examiner—Karin Tyson
Attorney, Agent, or Firm—Flehr, Hohbach, Test, Albritton & Herbert

[57] ABSTRACT

A method and system for effecting pneumatically cushioned independent front steer axle suspension for s Class 8 (33,001 lb+GVW) highway truck. An air spring rocker is provided to improve the fit arrangement of the front suspension components. By its pivoting action, the air spring rocker serves to take the vertically-directed suspension load and redirect this load to compress a suspension air spring in a horizontal direction, against a chassis frame rail side member. The left hand side road wheel is enabled to articulate independently of the articulation movement of the right hand side road wheel, and vice versa.

6 Claims, 4 Drawing Sheets

INDEPENDENT FRONT AIR SUSPENSION APPARATUS AND METHOD

This is a continuation of application Ser. No. 07/409,248 filed Sept. 19, 1989, now abandoned.

BACKGROUND OF THE INVENTION

1. Field of the Invention

The present invention relates generally to steering axle suspension for a heavy truck. More specifically, the present invention relates to an independent front air suspension for the steering axle of a heavy truck.

2. Prior Art

Independent front axles are universally applied in passenger cars and light trucks. In most cases such vehicles use coil springs (typically in a vertical position) or leaf springs. Independent front axles (or "suspensions") allow each of the front steering wheels (left and right) to absorb shocks independent of one another. Although their use is pervasive in automobiles, they have not been used in heavy trucks.

There are two primary reasons for the absence of independent front suspensions in trucks. The first is that trucks are designed to haul freight and not as pleasure vehicles. Cars, on the other hand, are designed for comfortable transportation. Independent front suspensions significantly further this end because with an independent front suspension road bumps and other disturbances of a smooth ride affecting one wheel are reacted in that wheel suspension assembly without affecting the other wheel. In a typical non-independent front suspension of prior art trucks, an impact or articulation affecting one wheel also affects the other wheel (because they are connected together through an axle beam) causing a more turbulent disturbance of the overall vehicle ride characteristics. The second reason is that trucks must have more sturdy suspension components to support the great weight they carry. These large components take up most of the available space, so much so that prior art independent front suspensions do not fit.

Prior art attempts to create an independent front suspension in a heavier vehicle include those attempts to provide the same in transit coaches (buses). A common prior art approach in this context is to install air springs for each wheel in a vertical position such that the air spring centerline is compressed in a vertical plane during suspension articulation. The prior art is characterized by this approach of suspension air spring mounting.

While transit coaches have front axle capacity similar to that of a Class 8 highway tractor (defined as having 33,001 lb. gross vehicle weight and up), their chassis arrangement is very different. Transit coaches typically have rear engine installations, narrow center beam frames and horizontal mounting of the steering gear. In such an arrangement there is room to mount the air spring vertically. This is not the case, however, in heavy trucks.

SUMMARY OF THE INVENTION

Accordingly, it is the object of the present invention to provide an independent front air suspension for a truck.

It is another object of the present invention to provide an independent front air suspension having an air spring rocker.

It is still another object of the present invention to provide an independent front suspension for a truck without using a vertically oriented air spring.

Furthermore, it is an object of the present invention to enable independent front axle air suspension to be used on a vehicle (in the described embodiment, a Class 8 highway tractor characterized by a 33,000 lb. gross vehicle weight) by means of an air spring rocker. The air spring rocker pivots on a rocker pin to deliver an air spring force into an upper support arm which is structurally connected to receive ground load reaction force from a tire/wheel/hub/spindle assembly. The air spring is compressed directly against a frame rail side member.

The air spring rocker is used to redirect the vertically-directed suspension ground reaction load into a horizontally directed compressive force against the air spring. The air spring rocker thus permits the air spring to be mounted horizontally, compressing against the web of the frame rail side member (as opposed to vertically, as in prior art devices).

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
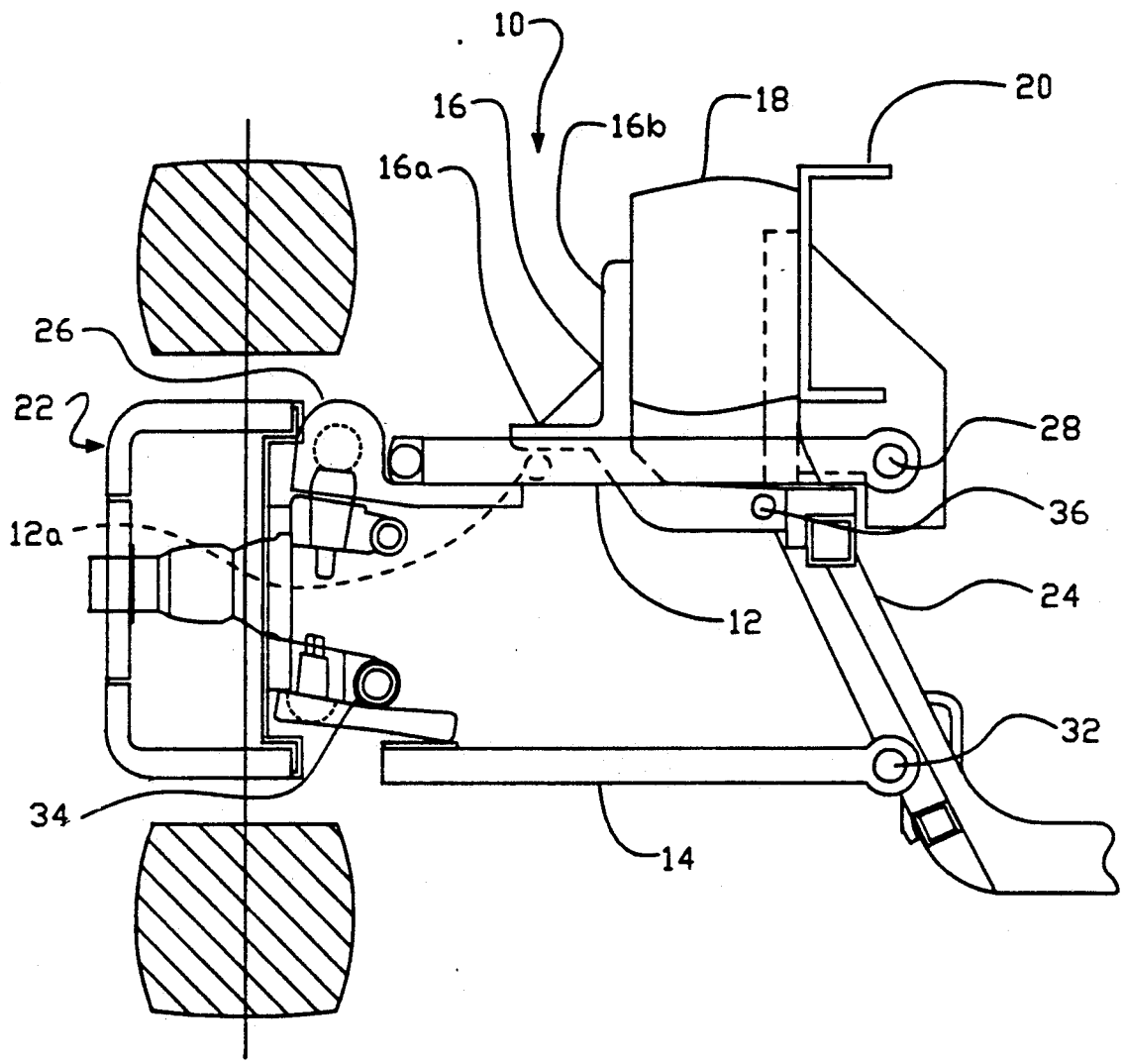
FIG. 1 is a rear view of the independent front air suspension of the preferred embodiment.

Referring to FIG. 1, a rear view of the independent front air suspension of the preferred embodiment is shown. The independent front air suspension of the preferred embodiment is comprised primarily of five parts. Those parts are a upper and lower support arm 12 and 14, a rocker 16, an air compression spring 18 and a frame rail 20. In essence, as the wheel 22 undergoes substantially vertical movement (or general articulation) as it traverses along a roadway, and even as it stands still, vertical force is transferred from the wheel to the upper support arm 12. This vertical force is then transferred to the rocker means which transfers the vertical force to a horizontal force. The horizontal force is then transferred to the air compression spring 18 and resisted by the frame rail 20. The use of the air spring rocker 16 permits independent front suspension in trucks because its use requires less space.

FIG. 1 shows the left rear side of the independent front air suspension assembly 10. The right side (not shown) is a mirror image of the left side. A suspension frame 24 is provided. The suspension frame 24 is connected to the frame rails (only one of which is shown) and forms sort of a "U" or "V" shape, the "U" or "V" shape circling under the engine 21 of the truck, as partially seen in FIG. 4. The lower support arms 14 is connected between the wheel (hub/wheel/tire assembly) 22 and the suspension frame 24. The upper support arm 12 is connected to upper ball joint 26 which is in turn connected to the wheel 22. The other side of the upper support arm 12 is connected to the upper arm bracket on the frame at pivot joint 28. The pivot joint 28 is used so that the upper support arm 12 can move up and down at its left end as the wheel 22 moves up and down.

The lower support arm 14 is similarly located and provides a similar function to that of the upper support arm 12. The lower support arm 14 is connected to ball joint 34. Both the ball joint 26 of the upper support arm 12 and the ball joint 34 of the lower support arm 14 are well known in the art. The other end of the lower support arm 14 is connected to the suspension frame 24 by pivot joint 32. Pivot joint 32 performs the same function as pivot joint 28. That is, permitting the left end of the lower support arm 14 to move up and down as the wheel 22 moves up and down. The substantially vertical forces on the wheel 22 are transferred to the upper support arm 12.

Located above the upper support arm 12 is the rocker 16. The rocker 16 is pivotally mounted to the suspension frame at pivot 36. The rocker 16 is designed to have a horizontal portion 16a which engages the upper support arm 12. The upper support arm 12 engages, but is not fixedly connected to the rocker 16 so that when vertical forces are exerted on the upper support arm (by the wheel) those forces are transferred directly to the rocker 16. Note that in addition to absorbing upward vertical force (at the wheel 22) the air spring 18 also extends outward when the wheel 22 moves vertically downward. In other words, the air spring 18 exerts a force on the rocker 16 throughout the entire anticipated vertical movement of the wheel 22. Therefore, the rocker 16 need not be fixedly connected to the upper arm 12. The rocker 16 is pivotally connected to the suspension frame 24. This configuration permits the rocker 16 to be directly responsive to movement in the upper support arm 12, in either the up or down direction.

The upper support arm 12 and the lower support arm 14 are actually "A"-shaped with an extra rung. This is better illustrated in the top view of FIG. 3. The rungs are not visible in FIG. 1 because they run horizontal and are obscured by the legs of the support arms 12 and 14. One rung 12a (in the upper support arm 12 in FIG. 1) is represented by dotted lines. The horizontal portion 16a of the rocker 16 rests on this rung 12a. Vertical forces are exerted through rung 12a to the rocker horizontal portion 16a and then to air spring 18.

The air spring 18 is located between the rocker 16 and the frame rail 20. A vertical portion 16b of the rocker 16 is maintained against the outside of the air spring 18. The other side of the air spring 18 is in contact with and pushes against the frame rail 20. As the rocker 16 is forced upward by forces on rung 12a, the rocker 16 pivots about pivot 36 and transfers force to the air spring 18. The air spring 18 is compressed as the force is resisted by the frame rail 20 (note, air springs and their compression under load are well known in the art).

Figure 2:
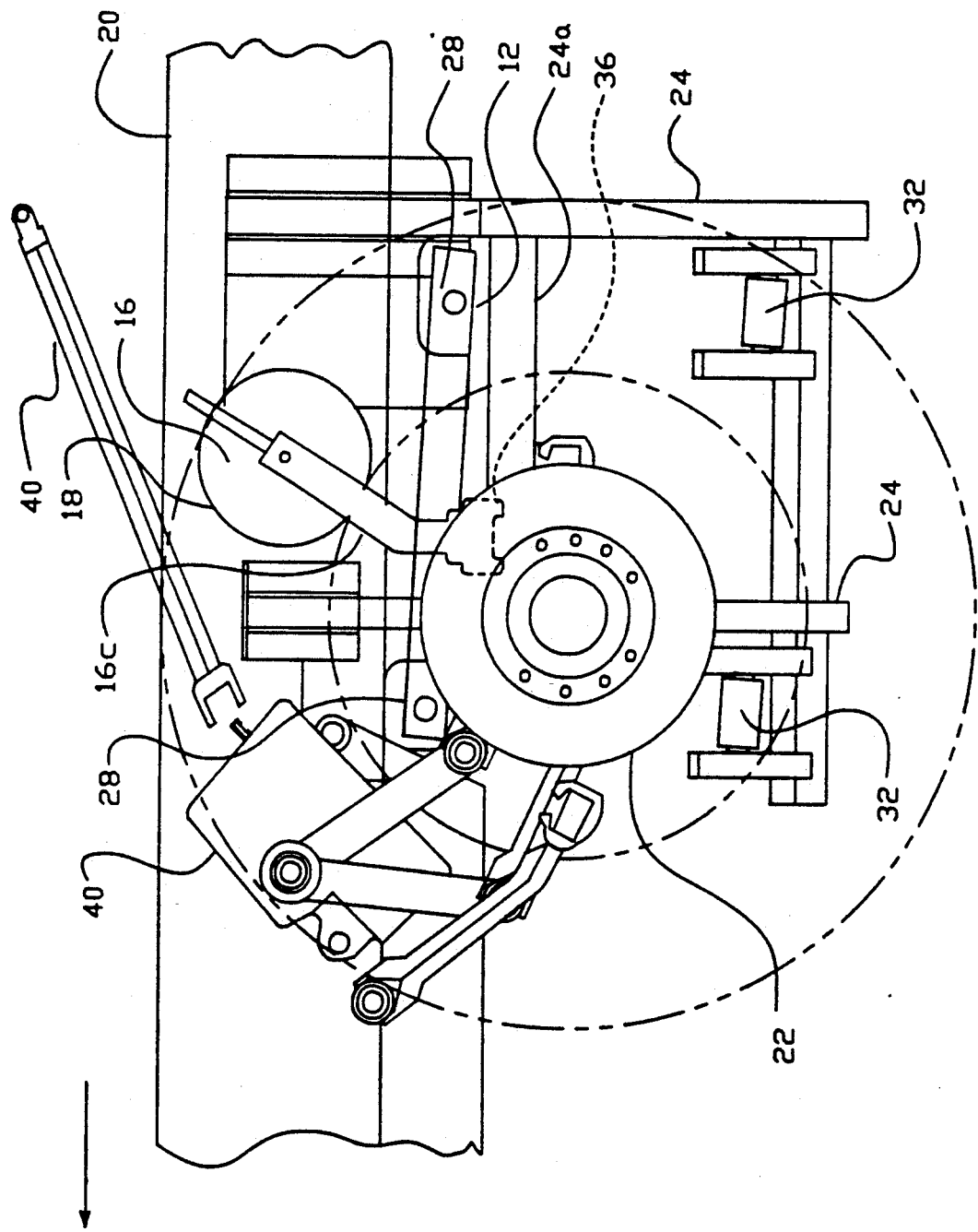
FIG. 2 is a left hand side view of the independent front air suspension of the preferred embodiment.

Referring to FIG. 2, a left side view of the independent front air suspension of the preferred embodiment is shown. The rocker 16 and the outside edge of the air spring 18 are shown in bold lines. As is evident from FIG. 2, a portion 16c of the rocker 16, curves to the right, or alternatively stated, curves toward the rear of the truck. The horizontal portion 16a of the rocker 16, and particularly its relationship to rung 12a, is not readily discernable from this perspective, but it can be clearly seen that the rocker pivot 36 is located below the upper support arm 12. The rocker pivot 36 is mounted to a support rung 24a in the suspension frame 24.

FIG. 2 illustrates that the upper support arm 12 (and lower 14) have two pivots each to accommodate their "A"-shape. The pivot joints 28 are for the upper support arm 12 and the pivot joints 32 are for the lower support arm 14. It is also apparent from FIG. 2, that each of the support arms 12 and 14 are inclined toward the front of the vehicle at an angle of approximately 3 degrees. One reason for this is that since the vehicle usually moves in the forward direction, a slight forward tilt of the suspension provides "anti-dive" during the forward weight transfer associated with brake application.

The location of the frame rail 20 with respect to the other suspension components is also evident from FIG. 2. The rocker 16 compresses the air spring 18 squarely against frame rail 20, a short distance behind the vertical line which intersects the center of the wheel 22. A steering mechanism 40 is also shown in FIG. 2. The steering mechanism 40 forms no part of the present invention, but is included to show the positioning of various suspension and steering components with respect to one another.

Figure 3:
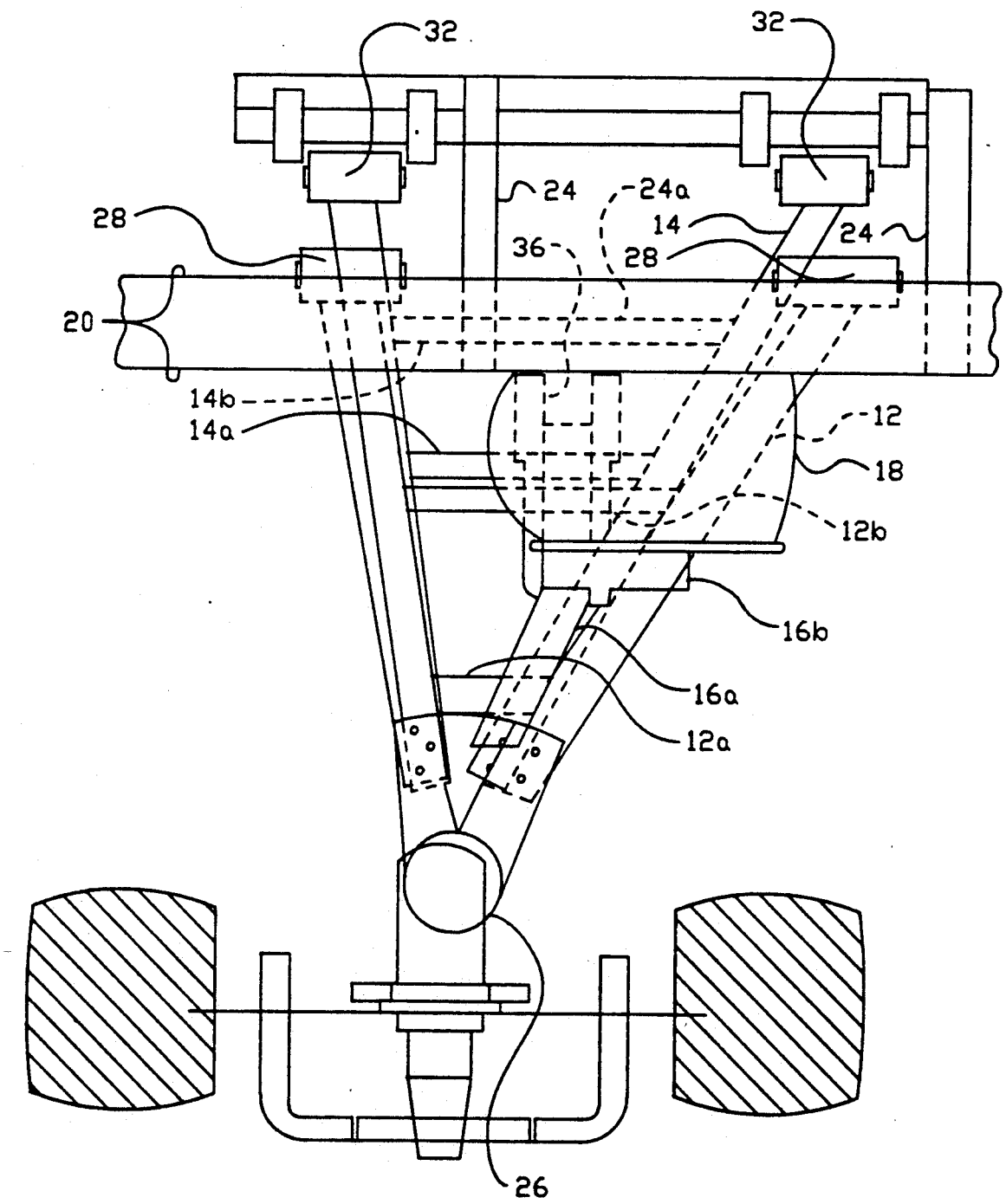
FIG. 3 is a top view of the independent front air suspension of the preferred embodiment.

Referring to FIG. 3, a top view of the independent front air suspension of the preferred embodiment is shown. From this perspective the "A"-shaped nature of the upper and lower support arms 12 and 14 can be seen. Focusing on the rocker 16, the horizontal portion of the rocker 16a is clearly visible on top of the first rung 12a of the upper support arm 12. The second rung 12b of the upper support arm can be seen transparently through the air spring 18. The lower support arm 14 (joined to the suspension frame 24 at pivots 32) also has two rungs 14a and 14b. From this view it is evident that the vertical portion 16b of the rocker 16 is essentially parallel to the frame rail 20 in the normal state. Consistent therewith, when the air spring 18 is compressed against the frame rail 20, the compression is relatively evenly distributed.

As stated previously, the rocker 16 is mounted at pivot 36 to rung 24a of the suspension frame 24. The two main portions of the suspension frame 24 appear vertically from the perspective of FIG. 3, rung 24a running between the two. Also appearing in FIG. 3 is a top view of the ball joint 26 which connects the upper support arm 12 to the wheel 22. Additionally, steering mechanism 40 is again included to illustrate positioning of various steering and suspension components with respect to one another.

Figure 4:
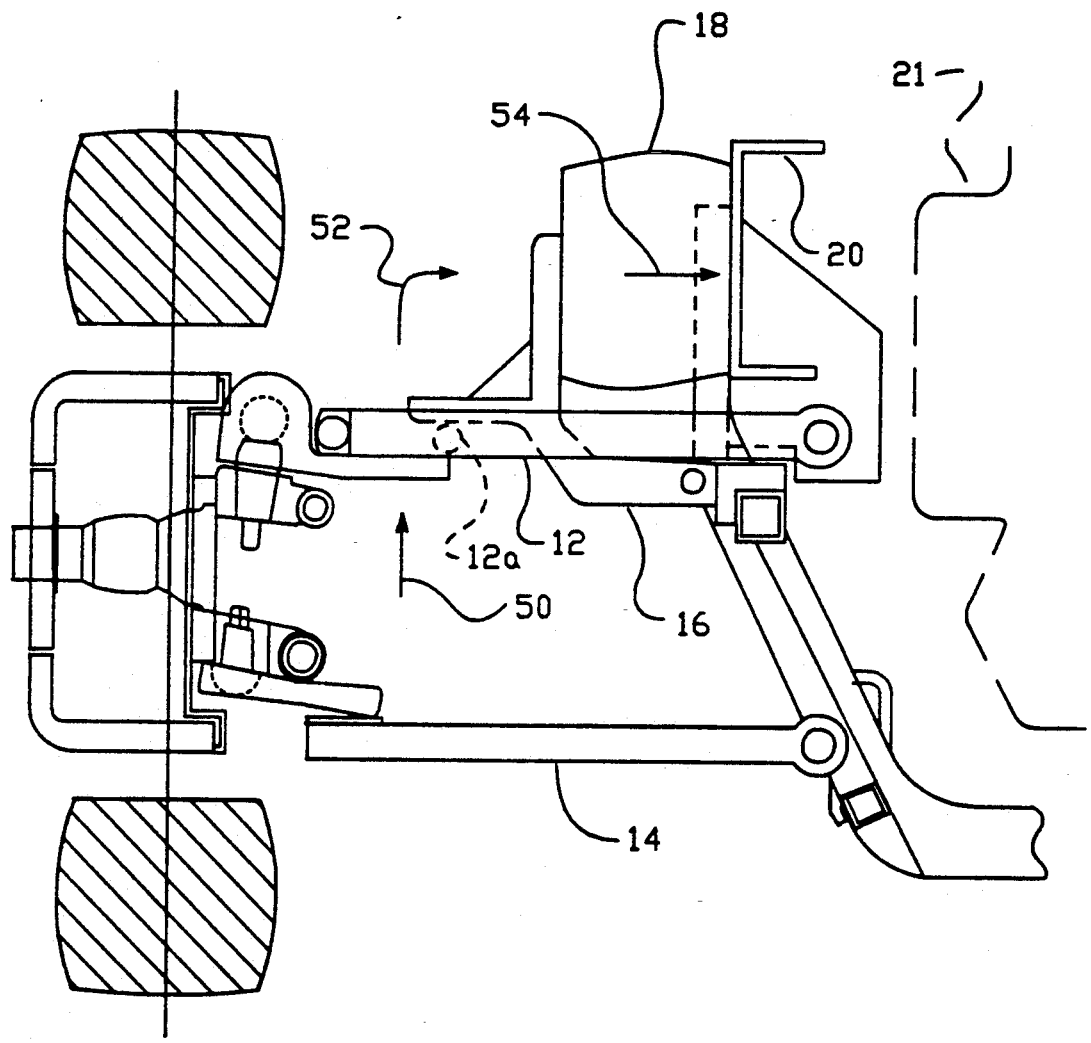
FIG. 4 is a rear view of the independent front air suspension of the preferred embodiment illustrating the transfer of vertical force to horizontal force by the rocker.

Referring to FIG. 4, the transfer of vertical to horizontal force is shown. The first arrow 50 indicates vertical force from the wheel 22, on the upper support arm 12 and the horizontal portion 16a of the rocker 16. The second arrow 52 indicates the transfer of that vertical force to horizontal force as the rocker 16 pivots in the direction of the transfer. The third arrow 54 represents the horizontal force being delivered through the air spring 18 into the frame rail 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An independent steering axle suspension for a truck, comprising:
    frame rail means extending longitudinally along a side of said truck for providing a primary support chassis for said truck;
    an independent steering axle assembly and a vehicle wheel mounted thereon;
    a suspension frame connected to said frame rial means said truck;
    support means mounted to said suspension frame for movement with respect thereto, said steering axle assembly being mounted to said support means, said support means including a top arm assembly and bottom arm assembly, each of the arm assemblies being generally A-shaped with an apex thereof connected to said steering axle assembly and a base thereof pivotally connected to said suspension frame so that substantially vertical displacement of said wheel and said steering axle assembly produces substantially vertical displacement of said support means;
    rocker means having a neck and two prongs, said rocker means being pivotally connected to said suspension frame by said neck, said two prongs diverging from said neck with a first prong of said two prongs contacting said support means proximate said apex of one of said arm assemblies and producing pivoting of said rocker means upon vertical displacement of said one of said arm assemblies and with a second prong of said two prongs extending from said neck to a position laterally spaced from and opposed to said frame rail means;
    compression spring means located between second prong of said rocker means and said frame rail means for compression therebetween; and
    said rocker arm means being pivoted to produce compression of said compression spring means by said second prong against said frame rail means upon pivoting of said rocker arm means upwardly by said support means to provide the primary shock absorber for said wheel.

2. The suspension of claim 1 wherein said compression spring means is a pneumatic compression spring means.

3. An independent front suspension for a truck having an axle assembly capable of articulation about a vertical axis, comprising:
    truck chassis frame rail means having a substantially vertically oriented side and providing a primary support structure for said truck, said frame rail means extending longitudinally along a side of said truck;
    a suspension frame connected to said frame rail means;
    an axle suspension assembly movably mounted to said suspension frame for vertical displacement relative thereto;
    an axle assembly mounted to said axle suspension assembly, said axle assembly articulating about a vertical axis to enable steering;
    a substantially horizontally oriented compression spring means mounted transversely to said vertically oriented side of said frame rail means; and
    rocker means having one end pivotally connected to said suspension frame and independent of said axle suspension assembly, said rocker means bearing against said axle suspension assembly and said horizontally mounted compression spring means, said rocker arm means producing substantially horizontal compression of said compression spring means against said side of said frame rail means upon vertical displacement of said axle suspension assembly.

4. The independent front suspension of claim 3 wherein said compression spring means is a pneumatic spring compression means.

5. In an independently steerable axle assembly for a truck including, a truck frame having a frame rail means extending longitudinally along a side of said truck, an axle assembly, an axle suspension assembly mounting said axle assembly to extend laterally outwardly of and proximate said frame rail means for vertical displacement of said axle assembly, and a spring biasing assembly biasing said suspension assembly in a downward direction to resiliently support the weight of said truck, the improvement in said axle assembly comprising:
    said spring biasing assembly including rocker means having first means independently mounted for engagement by said suspension assembly upon vertical displacement of said suspension assembly, and having second means connected to said first means and extending in laterally spaced and opposed relation to said frame rail means, said rocker means being pivotally mounted to said truck frame to produce movement of said second means toward said rail frame means upon upward displacement of said first means while engaged with said suspension assembly; and
    said spring biasing assembly further including spring biasing means extending transversely to said rail frame means and positioned between and contacting said second means and said frame rail means and biasing said second means in a direction away from said rail frame means.

6. The independently steerable axle assembly of claim 5 wherein,
    said spring biasing means is a pneumatic compression spring.

* * * * *